(12) United States Patent
Young

(10) Patent No.: US 12,079,963 B2
(45) Date of Patent: Sep. 3, 2024

(54) SYSTEM, METHOD AND DEVICE FOR HEADS UP DISPLAY FOR A VEHICLE

(71) Applicant: Pylon Manufacturing Corporation, Deerfield Beach, FL (US)

(72) Inventor: William Young, Parkland, FL (US)

(73) Assignee: Pylon Manufacturing Corporation, Deerfield Beach, FL (US)

( * ) Notice: Subject to any disclaimer, the term of this patent is extended or adjusted under 35 U.S.C. 154(b) by 186 days.

(21) Appl. No.: 17/407,890

(22) Filed: Aug. 20, 2021

(65) Prior Publication Data

US 2022/0067887 A1 Mar. 3, 2022

Related U.S. Application Data

(60) Provisional application No. 63/068,844, filed on Aug. 21, 2020.

(51) Int. Cl.
G06T 5/70 (2024.01)
B60R 1/00 (2022.01)
G02B 27/01 (2006.01)
G06V 20/56 (2022.01)
G10L 15/22 (2006.01)
H04R 1/08 (2006.01)

(52) U.S. Cl.
CPC .............. *G06T 5/70* (2024.01); *B60R 1/00* (2013.01); *G02B 27/0101* (2013.01); *G06V 20/56* (2022.01); *G10L 15/22* (2013.01); *H04R 1/08* (2013.01); *B60R 2300/105* (2013.01); *B60R 2300/205* (2013.01); *B60R 2300/30* (2013.01); *G02B 2027/0138* (2013.01); *G02B 2027/014* (2013.01); *G06T 2207/10028* (2013.01); *G06T 2207/10044* (2013.01); *G06T 2207/20004* (2013.01); *G06T 2207/30248* (2013.01); *G10L 2015/223* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 2003/0095080 | A1* | 5/2003 | Colmenarez | G06T 5/002 345/7 |
| 2014/0192181 | A1* | 7/2014 | Taylor | B60R 11/04 348/118 |
| 2017/0176196 | A1* | 6/2017 | Powers | E01F 9/40 |
| 2018/0031384 | A1* | 2/2018 | Lee | G01C 21/365 |

* cited by examiner

Primary Examiner — Jwalant Amin

(57) ABSTRACT

A system for displaying a driving scene to a passenger in a vehicle includes first and second cameras for capturing images of the driving scene; a processor that receives the images from the first and second cameras, applies noise filtering to the received images to at least partially remove occlusions from the images of the driving scene received from the first and second cameras related to a weather condition; and a display that receives the filtered images from the processor after application of the filtering operation and displays the filtered images of the driving scene.

13 Claims, 6 Drawing Sheets

SYSTEM, METHOD AND DEVICE FOR HEADS UP DISPLAY FOR A VEHICLE

FIELD OF THE INVENTION

The present disclosure generally relates to systems, methods and devices that provide environmental information, such as an image of the frontal view of a vehicle, while filtering out extraneous information, such as rain or snow, in real time. The disclosure is suitable for use with land vehicles, such as automobiles, but may also be applicable to other types of vehicles, such as airplanes, boats or submarines.

BACKGROUND

Vehicles, such as automobiles, with windshields or windows that provide their operators an optical view of the surrounding environment are occasionally operated in environmental conditions that occlude or disrupt the operator's visual field, such as snow or rain. Due to these occlusions, drivers may often be forced to drive under extremely challenging weather conditions. A typical example is the onset of a storm, where visibility may be suddenly and severely impeded.

Despite advancements in digital signal processing technologies, including computer vision, pattern recognition, image processing and artificial intelligence (AI), little has been done to assist drivers with the highly demanding decision-making involved when environmental conditions provide an impediment to normal vision. The present disclosure provides a novel head up display system that can provide the operator of a vehicle with a visual display of the environment, with the occlusions removed.

SUMMARY

The following presents a simplified summary of the disclosure in order to provide a basic understanding of some aspects of the disclosure. This summary is not an extensive overview of the disclosure. It is not intended to identify key, or critical, elements of the disclosure or delineate the scope of the disclosure. Its sole purpose is to present some concepts of the disclosure in a simplified form as a prelude to the more detailed description that is presented later.

The present disclosure is generally directed to a system, method and apparatus for displaying a driving scene to an operator or passenger in a vehicle. The system may include a first sensor having a field of view and facing in the forward direction of the vehicle and for capturing images of the driving scene; a second sensor for taking measurements of the environment external to the vehicle; a processor that receives the images from the first sensor, the measurements from the second sensor and applies noise filtering to the received images. In one embodiment the filtering is implemented to at least partially remove occlusions from the images of the driving scene received from the first sensor related to a weather condition. The system may also include a display that receives the filtered images from the processor after application of the filtering operation and displays the filtered images of the driving scene.

The following description and drawings set forth in detail certain illustrative aspects of the disclosure. These aspects are indicative, however, of but a few of the various ways in which the principles of the disclosed system and method may be employed and the present disclosure is intended to include all such aspects and their equivalents. Other advantages and novel features of the disclosed system and method will become apparent from the following description of the subject matter disclosed herein when considered in conjunction with the drawings.

DESCRIPTION OF THE DRAWINGS

The drawings, in which like numerals represent similar parts, illustrate generally, by way of example, but not by way of limitation, various exemplary implementations discussed in the present document.

DETAILED DESCRIPTION OF ILLUSTRATIVE EMBODIMENTS

Figure 1:
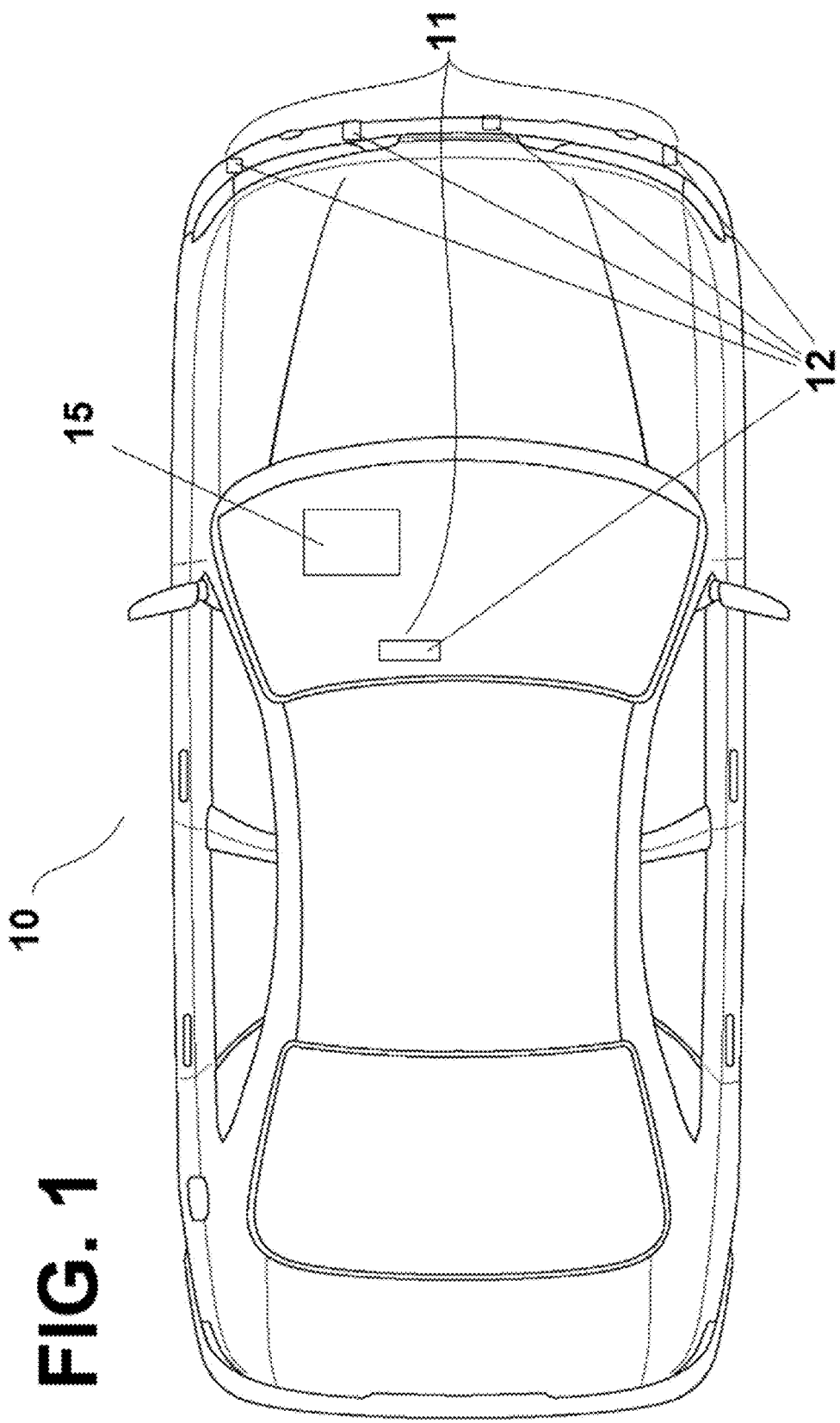
FIG. 1 illustrates a top view or a vehicle having a sensor array, and a system in accordance with the disclosed concepts.

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Implementations of the disclosure may include or involve the use of computing devices. Specifically, embodiments of present disclosure may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, Android tablet, etc.), multi-touch devices, smart phones, personal digital assistants, other multi-function devices, stand-alone kiosks, etc.

The disclosure may be described in the general context of computer-executable instructions, such as program modules, being executed by one or more computing devices. Generally, program modules include routines, programs, objects, components, data structures, etc., that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices and Internet or cloud-based storage devices.

The various embodiments and/or components, for example, modules, elements, or components and controllers therein, also may be implemented as part of one or more computers or processors or they may be implemented as software modules or components. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor. Also, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible, non-transitory computer-readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

FIG. 1 illustrates a top view of a vehicle 10 having a sensor array in accordance with the disclosed concepts. Vehicle 10 may be provided with an array 11 of one or more sensors 12, and a head-up display (HUD) 15. The sensors 12 may include cameras, range finders, sonar, radar, lidar, or any other suitable sensors that can provide information about the external environment of vehicle 10. The sensors may be positioned internally or externally on the vehicle, in any suitable location where they can measure or capture all or a part of the field of view to be displayed on the heads-up display 15 in accordance with one embodiment. Sensors may be mounted on the periphery of the vehicle, on the roof of the vehicle, within the passenger compartment of the vehicle (such as a camera mounted behind the windshield), or in any other suitable location where it may capture, measure or record all or a portion of the desired field of view of the vehicle.

The sensors 12 may provide their captured images 31 (FIG. 8) or measurements to one or more processing systems 20 (FIG. 6) as described below. These measurements may include the output produced by sensors such as range finders, sonar, radar, lidar, microphones or any other suitable sensors that can provide information about the external environment of vehicle. These captured images 31 or measurements may then be processed in order to generate a clean image 39 (FIG. 8), which is then displayed to the operator of the vehicle via the head-up display (HUD) 15 in accordance with one embodiment. Persons of skill in the art will recognize that additional similar processing systems 20 may be provided on the vehicle to account for other fields of view, such as the rear and side fields of view. Sensors 12 on vehicles having multiple field of view processing systems 20 may provide their captured images 31 or measurements to one or more such processing systems 20. Alternatively, a single processing system 20 (FIG. 6) may also generate clean images 39 that filter out for multiple fields of view.

Figure 2:
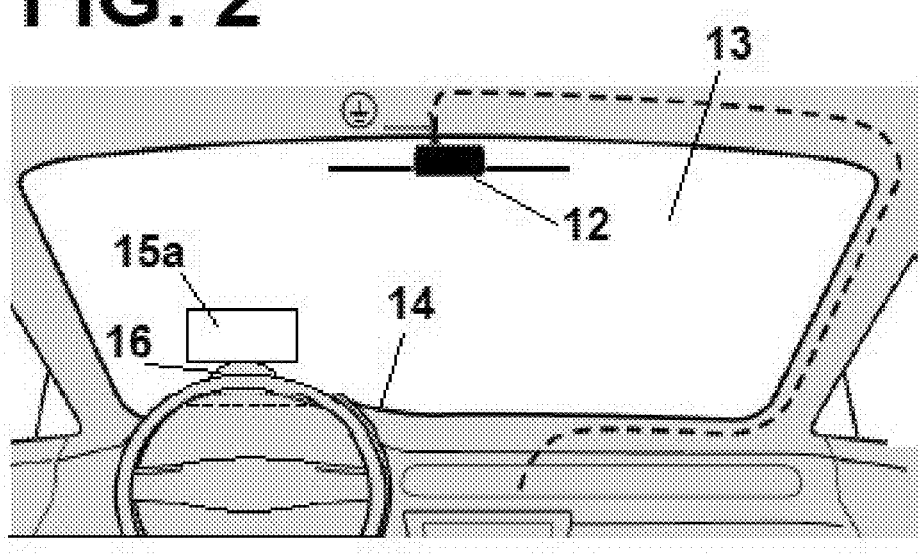
FIG. 2 illustrates an operator's point-of-view view of a vehicle windshield with a head-up display in accordance with the disclosed concepts.

FIG. 2 illustrates an operator's point-of-view view of a vehicle windshield with a HUD 15a that is separate from the windshield 13, in accordance with the disclosed concepts. The HUD 15a may be mounted to the dashboard 14, and may be housed within the dashboard 14 when not in use. For example, when the HUD is activated, it may rotate, project, or otherwise emerge from its housing 16 in the dashboard 14 and into the operator's field of view. The HUD 15a can then display clean images 39 (e.g., FIG. 9) provided by the processing of images captured by camera 12 by the system 20 until the HUD 15a is deactivated. At that point the HUD 15a may rotate, recede, or otherwise return to its housing 16.

Figure 3:
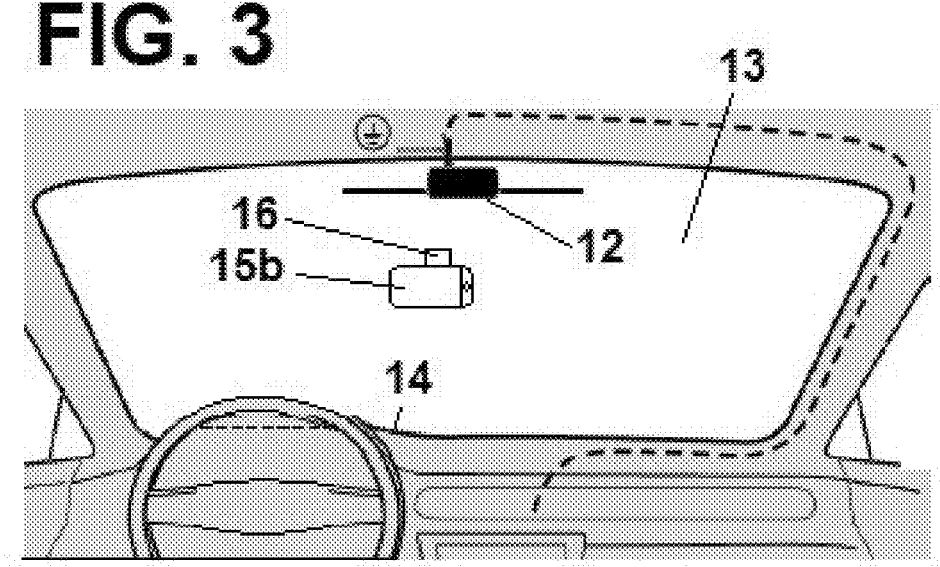
FIG. 3 illustrates an operator's point-of-view view of a vehicle windshield with a head-up display implemented on a smart device in accordance with the disclosed concepts.

FIG. 3 illustrates an operator's point-of-view view of a vehicle windshield with a HUD implemented on a smart device 15b, such as a smart phone. Specifically, in lieu of a built-in HUD, the processing system may communicate clean images 39 to a smart device 15b, that can be mounted via a stand or other mount 16 onto the windshield 13 or dashboard 14 within the vehicle operator's field of view. Alternatively, the smart device may be mounted directly on the operator, for example as smart goggles/glasses that the user wears, wherein the smart device HUD 15b is displayed directly on the lenses of the smart device. The communication between the processing system and the smart device HUD 15b may be through any suitable wired or wireless connection, including but not limited to USB, Bluetooth, WiFi, etc.

Figure 4:
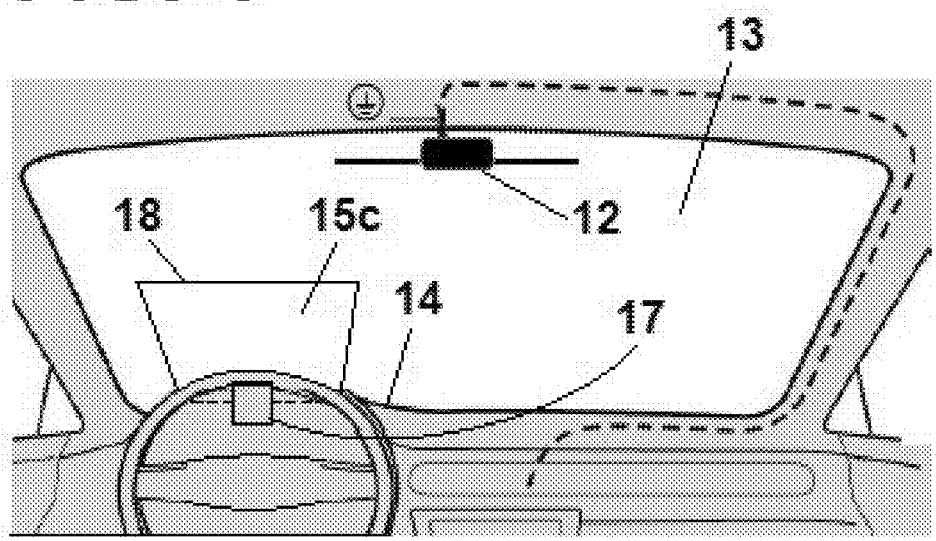
FIG. 4 illustrates an operator's point-of-view view of a vehicle windshield with a head-up display projected onto the windshield in accordance with the disclosed concepts.

FIG. 4 illustrates an operator's point-of-view view of a vehicle windshield with a HUD image 15c that is projected onto the windshield 13. Specifically, one or more projectors 17 may be located on the dashboard 14, and may be configured to project clean images 39 onto a display portion 18 of the windshield 13 that is within the operator's field of view. When the operator activates the HUD 15c, the projectors activate, and project clean images 39 received from the processing system onto a portion 18 of the windshield 13 where the operator can see them.

Figure 5:
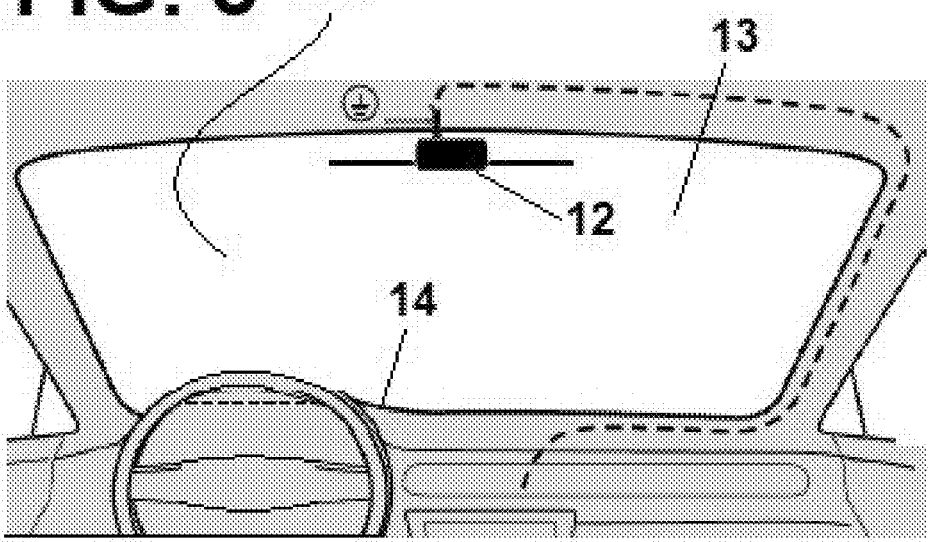
FIG. 5 illustrates an operator's point-of-view view of a vehicle windshield with a head-up display built into the windshield in accordance with the disclosed concepts.

FIG. 5 illustrates an operator's point-of-view view of a vehicle windshield with a head-up display built into the windshield. Either a portion or the entirety of windshield 13 may be configured to serve as a HUD 15d. This can be accomplished by having a windshield that also acts as a display, for example, by being outfitted with a smart film that is capable of displaying a clean image 39 within the operator's field of view at a suitable level of detail.

In one implementation, a subset of the sensors 12 may be cameras mounted inside the vehicle that track the driver's head movements. The tracking data may be input to the processing system 20 for processing such that the images displayed on the HUD are adjusted in accordance with the tracked head movements.

Figure 6:
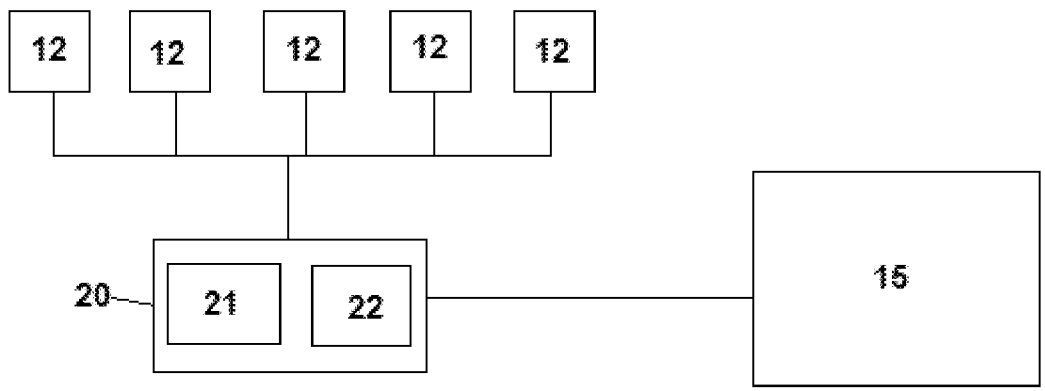
FIG. 6 illustrates a diagram of the system modules in accordance with one exemplary implementation of the disclosed concepts.

FIG. 6 illustrates a diagram of a processing system in accordance with the disclosed concepts. The system may include sensors 12, which take measurements of, or capture images of a field of view, or a portion thereof, of an external environment. The sensors may be in wired or wireless electrical communication with a processing system 20, which is in turn in wired or wireless communication with a HUD 15, 15a, 15b, 15c, 15d. The sensors may transmit captured images 31 and measurements to the processing system 20. The processing system may include a memory 21 and a processor 22, and as discussed in greater detail below, the memory may contain instructions that when executed by the processor may cause the processing system to process the captured images 31 and/or measurements in accordance with one of the methods described below. The processing system may generate one or more clean images 39 from the information received from the sensors, and transmit the same to the HUD 15, 15a, 15b, 15c, 15d to be displayed within the operator's field of view. Any suitable system(s) of wireless communication may be used, including but not limited to USB, Ethernet, WiFi, BlueTooth, etc.

In one implementation, the processing system 20 may apply a filtering process to the captured image data to remove occlusions. For example, if rain droplets is the type of occlusion that is to be removed in order to display a clean image, the processing system may consider the images captured by one or more sensors 12 and apply a noise filtering algorithm or a noise cancellation algorithm to the captured images.

Because the rainfall intensity varies constantly, in one implementation the processing system 20 implements an adaptive filtering algorithm. In one implementation, the processing system 20 may implement predictive filtering. One or more of the sensors 12 may be a microphone that captures external sound corresponding to the intensity of the rainfall and the sound data may be used by the processing system 20 to fine tune the filtering process. In yet another implementation, the processing system 20 may access external data from an app that provides the location of the vehicle and weather information in order to fine tune the filtering process.

Figure 7:
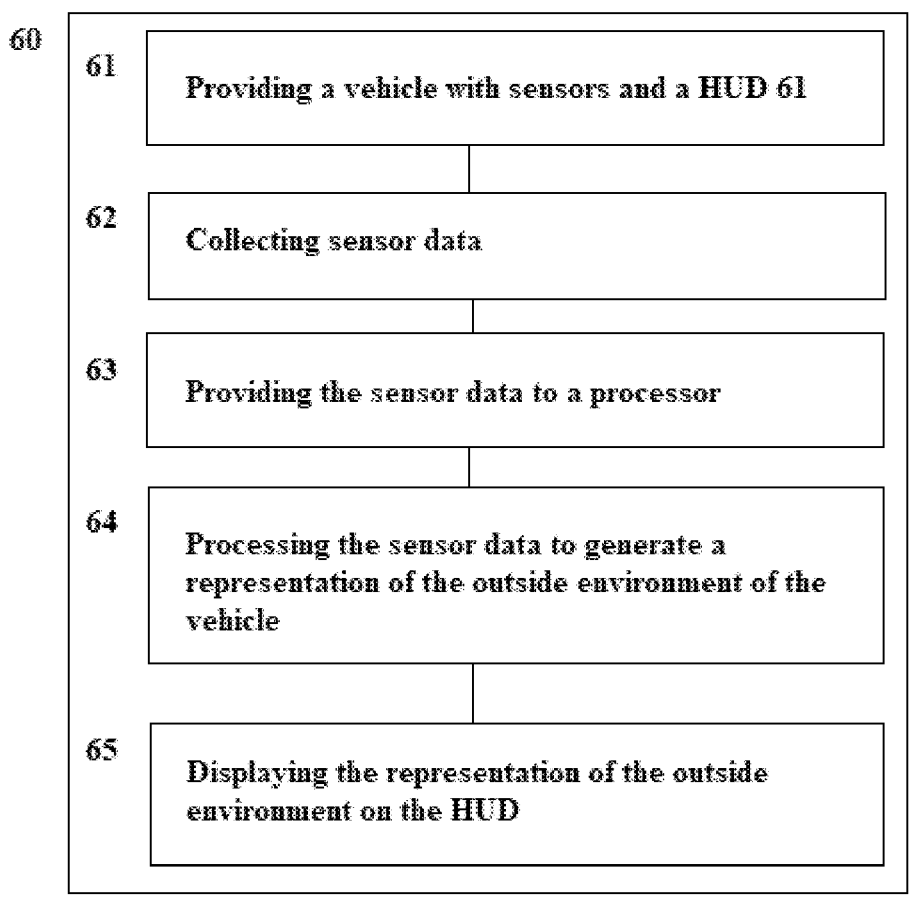
FIG. 7 illustrates a flow diagram for a method in accordance with the disclosed concepts.

FIG. 7 illustrates a flow diagram of a method 60 for providing filtered representation of the outside environment of the vehicle in accordance with the disclosed concepts. Method 60 may include providing a vehicle with an array of sensors and a HUD (step 61); collecting sensor data (step 62) from the sensor array, such as captured images or taken measurements of the external environment of the vehicle; providing the sensor data to a processor (step 63); processing the sensor data (step 64) in the processor to generate a clean representation of the outside environment of the vehicle (as described with respect to FIG. 6); and displaying the clean representation of the outside environment on the HUD (step 65).

Providing a vehicle with an array of sensors and a HUD (step 61) may include providing the vehicle 10 with an array 11 having one or more sensors 12, which can include cameras, range finders, sonar, radar, lidar, or any other suitable sensors that can provide information about the external environment of vehicle 10, as discussed above. Similarly, it may include providing the vehicle with any of the HUDs 15, 15a, 15b, 15c, 15d discussed above.

Collecting sensor data from the sensor array (step 62) may include collecting a digital representation of the sensor data indicative of the environment outside the vehicle. Collecting sensor data may involve capturing images or taking measurements of the environment outside the vehicle, which may include powering up a sensor 12, sending a signal to a sensor 12 to capture an image or take a measurement, or simply opening a communication channel with the sensor 12 or otherwise recording a signal from a sensor 12, such as a passive sensor, representative of a captured image or a taken measurement.

Providing the sensor data to a processor (step 63) may include transmitting the sensor data to a processor that may execute instructions to process the sensor data and generate a clean representation of the outside environment. This may be accomplished through a wired or wireless connection, and may use any suitable protocol known in the art or to be developed.

Processing the sensor data (step 64) in the processor to generate a clean representation of the outside environment of the vehicle may use, for examine high pass, low pass, band pass, or any other type of digital filters for applying filtering algorithms to the captured images. Edge-finding algorithms may be used to identify edges of structures or objects in the environment, range finder or lidar data maybe mapped onto the captured images to further identify structures (such as buildings) or other objects (such as vehicles), or the focus of the cameras may be adjusted so that future measurements diminish the appearance of rain in captured images. Processing sensor data (step 64) may involve removing noise, such as rain or snow, from captured images to generate a filtered image, which may be implemented through use of noise cancellation, adaptive, or predictive filters. Alternatively, the processing algorithms may generate a wire frame, or other 3D representation, of the environment outside the vehicle that can be displayed to the user via the HUD. Any suitable algorithm known in the art or to be developed may be used in connection with the disclosed concepts.

Displaying the representation of the outside environment on the HUD (step 65) may include use of any of the HUDs described above. It may involve displaying a filtered image to the user, overlaying a wire frame on the operator's view of the environment, overlaying a corrected image that removes rain, snow or other noise from the operator's view, etc.

Figure 8:
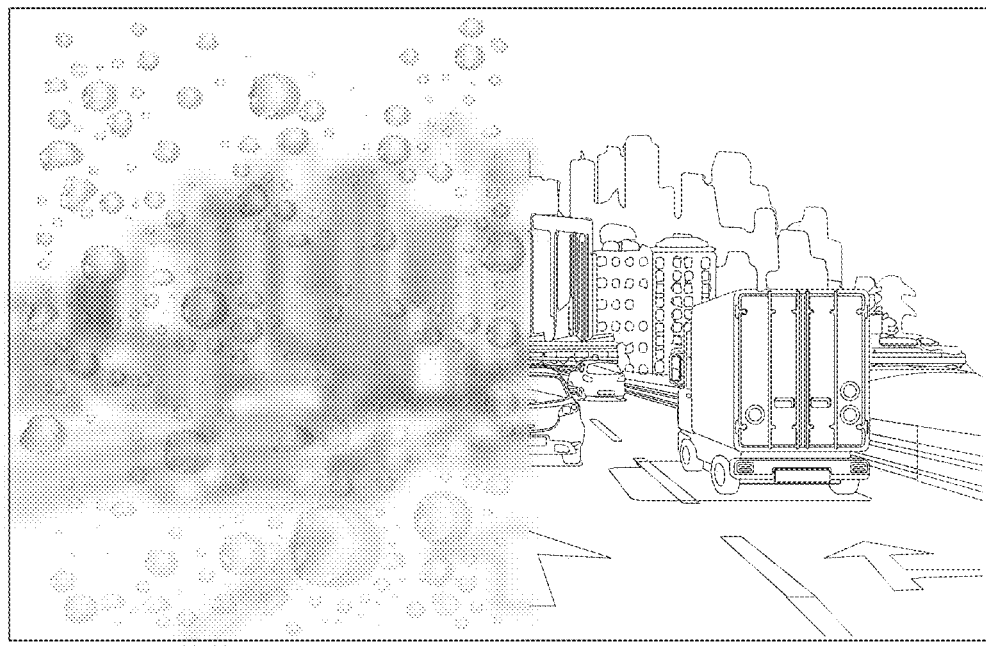
FIG. 8 illustrates a side by side comparison of an image prior to processing and post processing in accordance with the disclosed concepts.

FIG. 8 illustrates a side by side comparison of an image prior to processing 31 and post processing 39 in accordance with the disclosed concepts.

Figure 9:
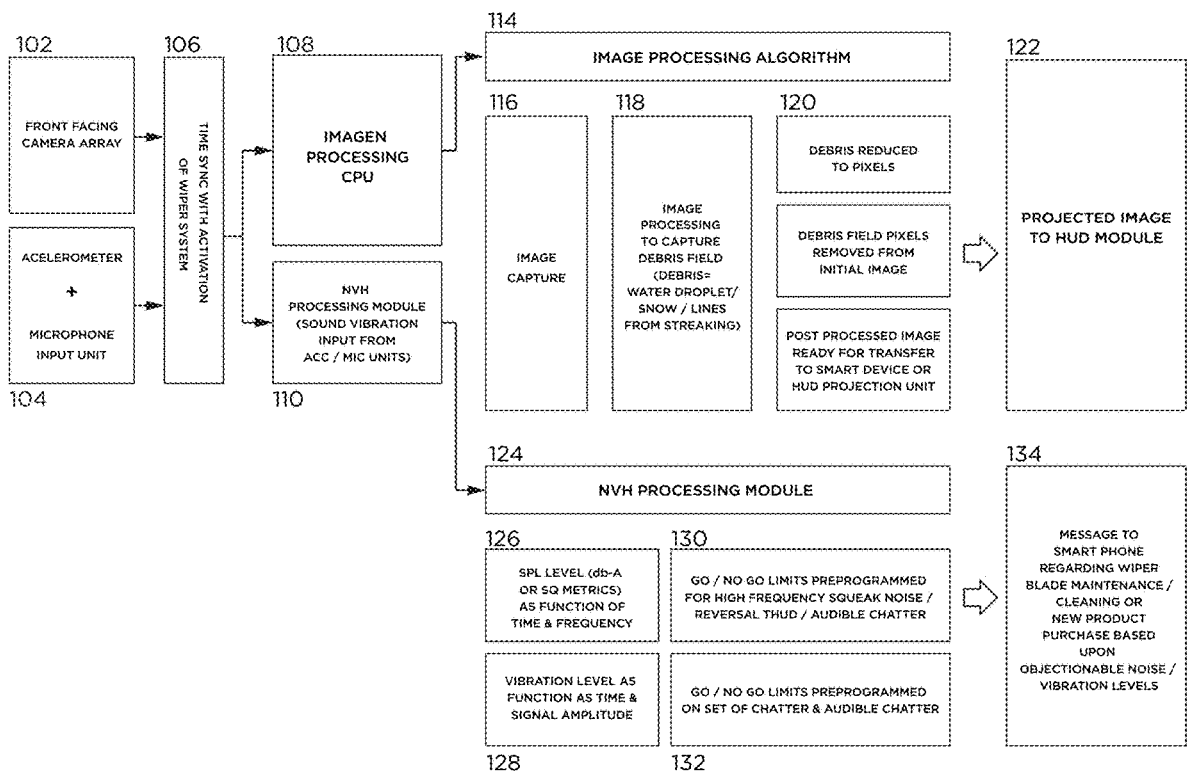
FIG. 9 illustrates a diagram of the system modules in accordance with another exemplary implementation of the disclosed concepts.

FIG. 9 illustrates a diagram of a processing system in accordance with another exemplary implementation of the disclosed concepts. The system may include an array of image capturing sensors 102 that face the front of a vehicle 10; other sensors such as an accelerator and a microphone 104; a module for detecting the activation of a wiper system 106; a dedicated image processing CPU 108; a noise, vibration, and harshness (NVH) processing module 110; and a HUD module 122.

The array of image capturing sensors 102 may include cameras, range finders, sonar, radar, lidar, or any other suitable sensors that can provide imaging information about the external environment of vehicle 10. The accelerator and a microphone 104 may be affixed to the windshield 13 and may be used to generate structure-borne audio data corresponding to the vibration generated by the wiper system when activated. In one implementation, the microphone may be used to capture sound corresponding to rainfall intensity. The module 106 detects when a wiper is activated to actuate across the vehicle's windshield, which may be used to activate the HUD system.

The dedicated image processing CPU 108 may be implemented as a DSP processing unit or a microcontroller programmed with filtering algorithms such as 2D noise cancellation filters, noise filters, adaptive filters or predictive filters. The filtering scheme applied may be selected by the vehicle's operator, it may be preconfigured, or it may change depending the data captured and depending on the external conditions. In one implementation the functionality of the CPU 108 may be carried out by processor 21.

The NVH processing module 110 may be implemented as a dedicated or general purpose microcontroller configured to determine an acoustic profile corresponding to the windshield wiper based on structure-borne audio data received from the accelerometer and microphone module 104. The HUD module 122 may be implemented as an interface between the CPU 114 and any of the HUDs 15 and 15a-d.

When the system is in operation, the module 106 detects the activation of the vehicle's wiper system and begins to collect data measured by the modules 102 and 104. Image data corresponding to the exterior of the vehicle (e.g., road) is input to the image processing CPU 108 and the audio data corresponding to noise and vibration generated by the wiper system is input to the NVH processing module 110. In one implementation, audio data corresponding to the sound of rainfall may be input to the image processing CPU 108.

The image processing CPU 108 runs an image processing algorithm 114 that receives a sequence of image captures 116 and then processes the sequence of images to capture, detect or recognize debris or occlusions 118. The occlusions are reduced to pixels and then filtered out of the captured images (120) in accordance with any of the filtering techniques described above. The image processing algorithm 114 then transfers the filtered sequence of images to HUD module 122.

The NVH module 110 may process the audio data corresponding to noise and vibration generated by the wiper system to calculate an SPL level metric as a function of time and frequency 126 and to calculate a vibration level as a function of signal amplitude and time 128. If the SPL level metric exceeds a preprogrammed threshold, the NVH module 110 may determine that the level of high frequency squeak noise, reversal thud, or audible chatter are not acceptable (130). Similarly, if the vibration level exceeds a preprogrammed threshold, the NVH module 110 determines that the level of set chatter or audible chatter is not acceptable (132). Based on the acoustic and vibration profiles calculated by the NVH module 110, the NVH module may be configured to provide an alert or generate a message to the vehicle operator's smart phone, for example, to indicate that the wiper system requires maintenance based on unacceptable levels of noise or vibration.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and structures described herein are intended to illustrate the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

As used herein, an element or step recited in the singular and proceeded with the word "a" or "an" should be understood as not excluding plural of said elements or steps, unless such exclusion is explicitly stated. Moreover, unless explicitly stated to the contrary, embodiments "comprising" or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112(f), unless and until such claim limitations expressly use the phrase "means for" followed by a statement of function void of further structure.

The invention claimed is:

1. A system for displaying a driving scene to an operator or passenger in a vehicle, the system comprising:
a first sensor having a field of view and facing in the forward direction of the vehicle and capturing images of the driving scene;
a second sensor for taking measurements of the environment external to the vehicle;
a processor that receives the images from the first sensor, the measurements from the second sensor and applies noise filtering to the received images, the noise filtering at least partially removing occlusions from the captured images of the driving scene received from the first sensor related to a weather condition;
a display that receives the filtered images from the processor after application of the filtering operation and displays the filtered images of the driving scene; and wherein the noise filtering applied by the processor comprises treating portions of said captured images corresponding to occlusions as electronic noise, generating a statistical model of the electronic noise, and modifying filtering parameters based on the statistical model to remove occlusions from the captured images.

2. The system of claim 1, wherein the second sensor measures sound related to said weather condition and generates an electronic signal corresponding to said sound, wherein said filtering parameters are further modified based on said electronic signal corresponding to said sound.

3. The system of claim 1, wherein the second sensor is positioned inside the vehicle and comprises a microphone for receiving voice commands and transmitting the voice commands to the processor; wherein the processor performs voice recognition of said voice commands; and wherein said filtering parameters are further modified based on said voice commands.

4. The system of claim 1, wherein the second sensor is affixed to the windshield of the vehicle, detects vibration caused by windshield wipers, and transmits a signal corresponding to said vibration to the processor; and wherein said filtering parameters are further modified based on said signal corresponding to said vibration.

5. The system of claim 1, wherein said first sensor is a camera, a range finder, a sonar, a radar, or a lidar.

6. The system of claim 1, wherein the processor applies image recognizing processing to the captured images to identify objects in the field of view of at least one predetermined type.

7. The system of claim 6, wherein objects of the at least one predetermined type comprise at least one selected from the group of: pedestrians, other vehicles, traffic signs, traffic controls, and road obstructions.

8. The system of claim 1, wherein the display comprises a head-up display.

9. The system of claim 8, wherein the head-up display comprises an LCD display device.

10. The system of claim 8, wherein the head-up display comprises a smart phone or a tablet.

11. The system of claim 8, wherein the head-up display drives a projection device to project the filtered images on to the windshield.

12. The system of claim 8, wherein head-up display is integrated with the windshield.

13. The system of claim 1, wherein said second sensor has a field of view and facing in the forward direction of the vehicle and capturing images of the driving scene; wherein the processor receives the images from the second sensor and applies noise filtering to the images received from the first and second sensors to at least partially remove occlusions from the images of the driving scene received from the first and second sensors related to a weather condition; and wherein the display receives the filtered images corresponding to the first and second sensors from the processor after application of the filtering operation and displays the filtered images of the driving scene.

* * * * *